July 13, 1937.    R. F. MIEHLE, JR    2,087,002
REEL AND SPINDLE MOUNT THEREFOR
Filed June 20, 1935
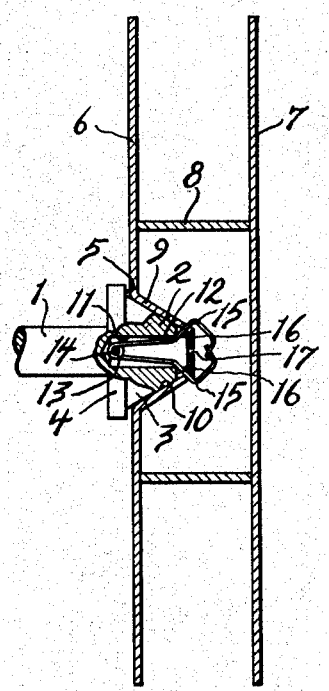
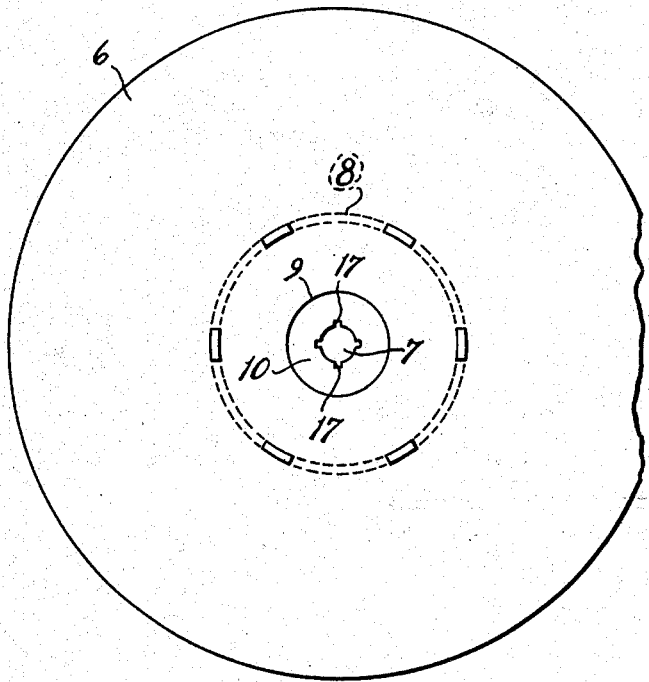
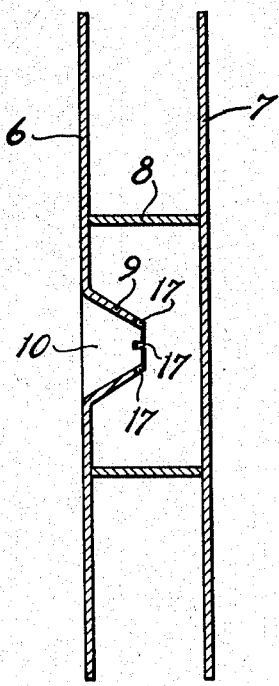
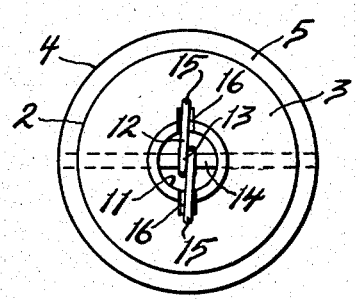
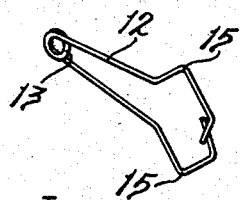
INVENTOR
Robert F. Miehle, Jr Patented July 13, 1937

2,087,002

UNITED STATES PATENT OFFICE 2,087,002

REEL AND SPINDLE MOUNT THEREFOR

Robert F. Miehle, Jr., Chicago, Ill., assignor to The Bell & Howell Company, Chicago, Ill., a corporation of Illinois Application June 20, 1935, Serial No. 27,495

5 Claims. (Cl. 242—70)

My invention has particular relation to reel and spindle mounts of the type usually employed on motion picture machines although not limited to this use alone.

The main feature of the invention relates to the provision of a novel and effective reel and spindle mount therefor, particularly with a view toward preventing reverse mounting of the reel on the spindle.

With this feature in view my invention consists of certain features of novelty in the construction, combination and arrangement of parts by which the said feature is effected, all as fully described with reference to the accompanying drawing and more particularly pointed out in the appended claims.

In the said drawing—

Figure 1 is a side elevation of a spindle mount partially broken away and shown in section, with a reel, shown in vertical section, mounted thereon, and embodying my invention;

Figure 2 is a face elevation of the reel shown in Figure 1;

Figure 3 is a vertical section of the reel;

Figure 4 is an enlarged end elevation of the spindle shown in Figure 1; and

Figure 5 is a perspective view of the reel retaining spring of the spindle.

Referring to the drawing, 1 designates a revolubly mounted spindle having an extending end portion forming the reel mount portion thereof. This extending end portion is provided with an external frusto-conical reel mount portion 2 decreasing in diameter toward the extending end of the spindle and forming an external tapered reel mount surface 3. An enlargement 4 is disposed at the inner end of this tapered portion and forms a shoulder 5 facing in the direction of the extending end of the spindle. See Figures 1 and 4.

The reel consists of spaced side plates 6 and 7 secured in a usual manner to opposite ends of a central tubular member 8, and the side plate 6 is provided with a frusto-conical reel mount aperture formation 9, preferably extruded therefrom as shown, extending inwardly from the plane of this side plate and decreasing in diameter, inwardly and providing an internal tapered reel mount surface 10 decreasing inwardly from the side plate 6. See Figures 1, 2 and 3.

The internal tapered reel mount surface 10 of the reel corresponds with the external tapered reel mount surface 3 of the spindle, and these surfaces are engaged in the mounting of the reel on the spindle, thus providing a mounting engagement which, being tapered, accommodates for manufacturing tolerances and provides close fitting engagement.

The reel is preferably retained on the spindle, with the mount surfaces 3 and 10 closely engaged, in the following manner.

The spindle 1 is provided with an axial bore 11 extending inwardly from the extending end thereof, and a U-shaped spring 12 extends in said bore and is provided with a coil 13 at its transverse portion which embraces a pin 14 secured in a transverse bore through the enlargement 4 of the spindle and extending across the inner end portion of the bore 11 of the spindle, the spring being thus mounted in the bore 11. See Figures 1, 4 and 5.

The ends of the spring 12 protrude from the extending end of the spindle and are reversely bent to form cam portions 15 projecting radially outward at diametrically opposite points at the extending ends of the spindle.

The cam portions 15 of the spring 12 engage through the small or inner end of the aperture formation 9 of the reel and axially engage the same to releasably retain the reel on the spindle with the mount surfaces 3 and 10 closely engaged, the cam formation of the portions 15 of the spring effecting the mounting and dismounting of the reel by excess axial pressure on the reel in the proper direction.

The extending end of the spindle 1 is diametrically slotted, as designated at 16, for engagement by the inner portions of the cam portions 15 of the spring to retain the cam portions against angular movement relative to the spindle, and in order to provide a positive driving engagement between the spindle and reel, the small or inner end of the aperture formation 9 of the reel is diametrically slotted, as designated at 17, for engagement by the cam portions 15 of the spring to form the positive drive connection.

Having thus described my invention, I do not wish to be limited to the precise details described as changes may be readily made without departing from the spirit of my invention, but having thus described my invention, I claim as new and desire to secure by Letters Patent the following:

1. In a device of the character described, the combination of a spindle adapted for the removable mounting of a reel over an end thereof and provided with an external tapered reel mount surface decreasing in diameter toward said end, a reel having a reel mount aperture formation providing an internal correspondingly tapered reel mount surface engageable on the reel mount surface of the spindle for the mounting of the reel thereon, and releasable means on the spindle and engageable through the small end of said reel mount aperture formation of the reel for retaining the reel on the spindle.

2. In a device of the character described, the combination of a spindle adapted for the removable mounting of a reel over an end thereof and provided with an external tapered reel mount surface decreasing in diameter toward said end, a reel including two axially spaced side plates one of which is provided with an axially extending reel mount aperture formation providing an internal correspondingly tapered reel mount surface engageable on the reel mount surface of the spindle for the mounting of the reel thereon, and spring means on the spindle and engageable through the small end of said reel mount aperture formation of the reel for retaining the reel on the spindle.

3. In a device of the character described, the combination of a spindle adapted for the removable mounting of a reel over an end thereof and provided with an external tapered reel mount surface decreasing in diameter toward said end, a reel including two axially spaced side plates one of which is provided with a reel mount aperture formation extending inwardly from the plane of this side plate and providing an internal correspondingly tapered reel mount surface decreasing in diameter inwardly from said plate and engageable on the reel mount surface of the spindle for the mounting of the reel thereon, said spindle being provided with an axial bore extending inwardly from said end thereof, and a U-shaped spring mounted in said bore and having the ends thereof protruding from said end of the spindle for engagement through the small end of said reel mount aperture formation of the reel for retaining the reel on the spindle, said spring ends being shaped for cam engagement with said aperture formation for the mounting and dismounting of the reel.

4. A reel spindle adapted for the removable mounting of a reel over an end thereof and provided with an external tapered reel mount surface decreasing in diameter toward said end, and releasable means on said spindle and operative in the region of the outer end of said reel mount surface for retaining a reel on the spindle.

5. A reel spindle adapted for the removable mounting of a reel over an end thereof and provided with an external tapered reel mount surface decreasing in diameter toward said end and provided with an axial bore extending inwardly from said end, and a U-shaped spring mounted in said bore and having the ends thereof protruding from said end of the spindle and reversely bent for retaining a reel on the spindle.

ROBERT F. MIEHLE, Jr.